United States Patent [19]
Baek et al.

[11] Patent Number: 5,608,747
[45] Date of Patent: Mar. 4, 1997

[54] THERMAL CROSS-TALK COMPENSATING CURRENT DRIVER FOR LASER DIODE ARRAY

[75] Inventors: Seung H. Baek, Pittsford; Thomas A. Mackin, Hamlin; Nea Y. Woo, Penfield, all of N.Y.

[73] Assignee: Eastman Kodak Company, Rochester, N.Y.

[21] Appl. No.: 421,163

[22] Filed: Apr. 13, 1995

[51] Int. Cl.⁶ ................................................ H01S 3/00
[52] U.S. Cl. .............................................. 372/33; 358/523
[58] Field of Search ................. 372/33, 38; 395/107, 395/109, 126; 358/443, 448, 455, 458, 461, 480, 482, 510, 521, 523, 534, 536

[56] References Cited

U.S. PATENT DOCUMENTS

| | | | |
|---|---|---|---|
| 4,804,975 | 2/1989 | Yip | 346/76 |
| 5,109,460 | 4/1992 | Baek et al. | 385/115 |
| 5,151,915 | 9/1992 | Paoli | 372/50 |
| 5,331,439 | 7/1994 | Bachar | 358/523 |
| 5,375,002 | 12/1994 | Kim et al. | 358/521 |
| 5,377,041 | 12/1994 | Spaulding et al. | 358/523 |
| 5,467,201 | 11/1995 | Fan | 358/448 |
| 5,479,189 | 12/1995 | Chesavage et al. | 358/523 |
| 5,479,272 | 12/1995 | Saito | 358/521 |
| 5,479,538 | 12/1995 | Takahashi | 358/456 |
| 5,481,380 | 1/1996 | Bestman | 358/523 |
| 5,485,284 | 1/1996 | Shono et al. | 358/523 |

Primary Examiner—Rodney B. Bovernick
Assistant Examiner—Robert E. Wise
Attorney, Agent, or Firm—Thomas H. Close

[57] ABSTRACT

A method and apparatus for operating a laser diode array in a laser thermal printer, wherein the laser diodes are formed on a common substrate, includes: generating digital image data signals for the individual diodes in the array; generating correction signals for each diode in the array, the correction signals being generated by weighting selected digital image data signals; summing the weighted correction signals with the digital image data signals for each diode in the array to produce control signals; employing the control signals to produce a driving current for each diode in the array; applying the driving currents to the diodes in the array.

12 Claims, 2 Drawing Sheets

THERMAL CROSS-TALK COMPENSATING CURRENT DRIVER FOR LASER DIODE ARRAY

FIELD OF THE INVENTION

The invention relates generally to methods and apparatus for controlling the output of a solid state laser, and more particularly to a method and apparatus for reducing thermal cross-talk between laser diodes in a laser diode array.

BACKGROUND OF THE INVENTION

In an imaging system utilizing the sublimation of dyes under the influence of heat from laser beams, beams are focused on the donor/receiver wrapped around a drum. Due to the high energy requirement of the sublimation process of typical dyes, it is advantageous to write with multiple laser beams to attain acceptable printing times.

As shown in U.S. Pat. No. 5,109,460 (S. Baek et al.), issued Apr. 28, 1992, a laser diode printing system has been built using a multiple line printhead with simple spot forming optics that is scanned across the image. The system is composed of a drum, a lead screw and a printhead. The optical system of the printhead is composed of a silicon V-grooved block for aligning a fiber array, an imaging lens and laser diodes. Multiple laser beams from one end of the fibers of the printhead are focused on a dye donor layer by a relaying lens. The printhead module is carried parallel to the drum axis in synchronization with the drum rotation. Multiple lines are written either helically or in a stepping-and-stare fashion to cover the whole imaging area. Image data is fed in proper synchronization with the drum rotation as well as the printhead module movement.

One alternative to the fiber array printhead is a laser diode array which can be individually addressed and modulated. See U.S. Pat. No. 4,804,975, issued to K. Yip, Kodak, entitled "Thermal Dye Transfer Apparatus Using Semiconductor Diode Laser Array". The advantage of using the laser diode array as the light source is that it can deliver more laser power to the donor at potentially a fraction of the cost of the fiber array printhead. When a laser is coupled to a fiber, about 50% of laser power is lost due to the mismatch of Numerical Aperture (N.A.) of the Emitting beam and the N. A. of the fiber (or acceptance angle of the fiber). Without the fiber coupling loss, the optical system efficiency of the laser diode array printhead can be more than 80%. The cost of the laser diode array is more expensive than a single element laser diode, but it is a lot less expensive than the cost of the equal number of single element laser diodes.

Disadvantages of the laser diode array are that the system may have a more complicated optical system and laser calibration problems due to a thermal cross-talk. Generally laser diodes emit an elliptical beam with a large aspect ratio. This makes the optical system more complicated than in the case of a fiber optic printhead system. In addition, a large field of view is required in the relay optical system to cover more than one element if a laser diode array is used in the system. Due to the difficulties mentioned above, the laser diode array has not been used as a light source for a printing system.

The reliability of a system using many active components depends upon the failure rates of each active component cascaded. Since a laser diode array has multiple elements on the same substrate, the reliability of the array is reduced substantially. This low reliability can be a serious problem to a printing system using the array. There are several ways to improve the reliability of the laser diode array system including employing a longer burn-in time for the lasers prior to installation in the equipment, and/or derating the operating power to the array.

Another potential difficulty in using the laser diode array in a laser thermal printer is the thermal cross-talk between adjacent elements in the array. Thermal cross-talk is a very difficult problem especially for a high quality image printing system.

It is well known that the output of a laser diode is very sensitive to the operating temperature of the active region. There are two ways to overcome this difficulty; temperature control and current control. The temperature control method controls the operating temperature of the active region to maintain it at as constant a temperature as possible by actively heating or cooling the laser diode. A thermoelectric temperature controller is often used for this purpose. The current control method controls the output power of the laser diode to maintain the output of the diode constant by adjusting the driving current by a close-loop feedback current driver. This method is more complicated and expensive. In some applications, the combination of two methods is used for better control of the output power of a laser diode.

According to another approach described in U.S. Pat. No. 5,151,915 issued Sep. 29, 1992 to Paoli, to eliminate the thermal variations that inherently accompany modulation of a laser's output by varying its driving current, the laser output is modulated by varying the voltage applied to a modulator region to operate the lasers at a somewhat elevated but constant temperature.

In using a laser diode array, it is not easy to apply the two thermal compensating methods described above. The spacing between the elements is so close that the operating condition of adjacent elements can influence the thermal equilibrium conditions of the neighboring elements. The laser diode array emits several closely spaced beams making the monitoring of optical power for each element extremely difficult. There is therefore, a need for an improved method to compensate the thermal cross-talk in a laser diode array which accounts for all possible operating conditions of the neighboring elements.

SUMMARY OF THE INVENTION

The present invention is directed to overcoming one or more of the problems set forth above. Briefly summarized, according to one aspect of the present invention, a method and apparatus for operating a laser diode array in a laser thermal printer, wherein the laser diodes are formed on a common substrate, are provided which includes: generating digital image data signals for the individual diodes in the array; generating correction signals for each diode in the array, the correction signals being generated by weighting selected digital image data signals; summing the correction signals with the digital image data signals for each diode in the array to produce control signals; employing the control signals to produce a driving current for each diode in the array; and applying the driving currents to the diodes in the array.

The present invention is advantageous over the prior art in that it is simpler and less expensive than the prior art methods and apparatus for controlling the output of a laser diode array, while providing comparable results in controlling the output of a laser diode array used in a thermal printer.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
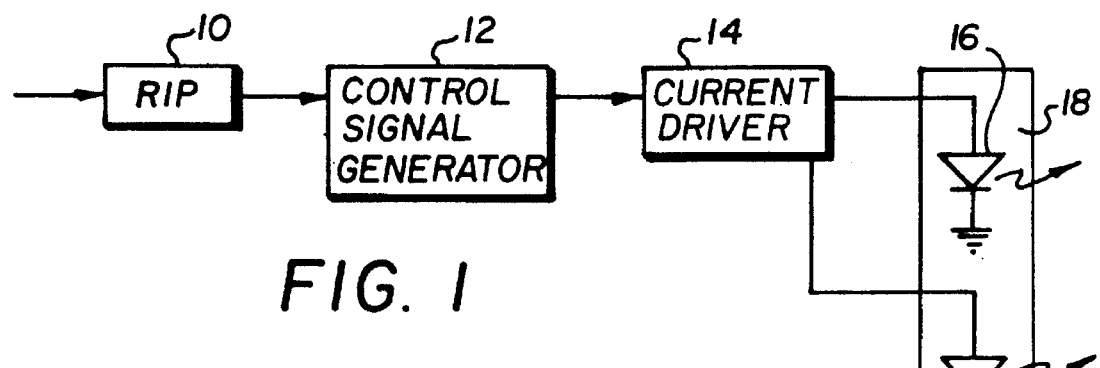
FIG. 1 is a block diagram showing the signal processing and current driver portions of a laser thermal printer employing the present invention.

Referring first to FIG. 1, a block diagram of the control electronics for a laser thermal printer is shown. The control electronics include a raster image processor (RIP) 10 which receives print signals from an application program running for example on a system controller (not shown). The RIP 10 produces standard rasterized image data and supplies the image data to a control signal generator 12. The control signal generator 12 processes the rasterized image data to produce control signals that are supplied to a current driver 14. The current driver 14 produces current pulses that are supplied to a plurality of laser diodes 16 that are integrated on a common substrate 18. In operation the output of the laser diodes is focused on a thermal printing medium to form a pixel wise image in response to the print signals as shown and described in the prior art. As noted above, thermal cross-talk between the diodes in the array can degrade the quality of the printed image. To correct this problem, a thermal cross-talk compensation technique employing weighting factors based on the signals applied to neighboring laser diodes is applied according to the present invention.

Since the relationship between the driving current and the optical output at one temperature in the operating range is nearly linear, the weighting factor will be constant for the entire operating range of the driving current at one operating temperature. The linear relation, however, does not hold when the laser diode junction temperature changes with the driving current (or optical power). The cross-talk compensation technique therefore needs to account for this non-linear behavior. This is accomplished according to the present invention by storing non linear empirically derived weighting factors in a lookup tables.

Figure 2:
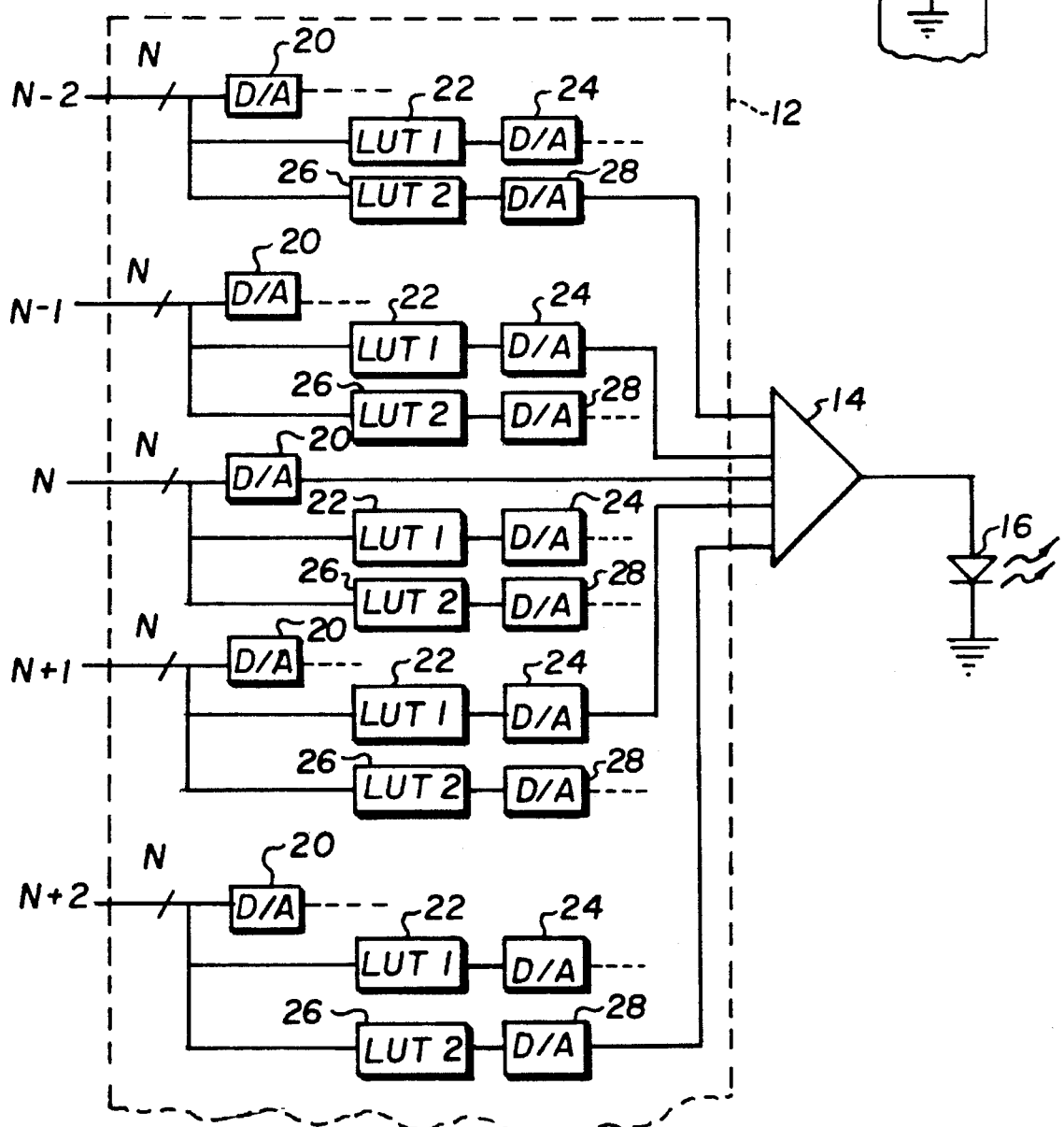
FIG. 2 is a schematic circuit diagram showing an illustrative portion of one embodiment of the control signal generator shown in FIG. 1, according to the present invention.

A control signal generator employing an analog thermal cross-talk correcting circuit according to the present invention is shown in FIG. 2. For purposes of description only a portion of the control signal generator 10 is shown, it being understood that identical apparatus is provided for each diode in the array. The control signal generator 12, includes a primary digital to analog (D/A) converter 20, a nearest neighbor look-up table (LUT$_1$) 22 connected to a D/A converter 24, and a next-nearest neighbor look-up table (LUT$_2$) 26 connected to a D/A converter 28, for each laser diode 16 in the array. The look-up tables 22 and 26 contain weighting factors for weighting the digital image data signals. The output from the primary D/A converter for the Nth laser diode 16 is summed with the weighted digital image signals for the nearest neighbor and the next nearest neighbors in the summing amplifier 14 to produce a current driving pulse for the Nth laser diode 16.

The weighting factors for each laser diode 16 are determined by calibrating the laser diodes one-by-one to derive weighting factors which are stored in the look-up tables. Initial calibration is performed by measuring the output of each laser diode with and without power applied to nearest neighboring and next nearest neighboring diodes. The loss in output of the measured diode is noted and weighting factors generated. A final calibration is performed by producing a test pattern on the printer and measuring the actual density differences in the test pattern to adjust the weighting factors.

In operation, the control signal generator 12 shown in FIG. 2 substantially removes the effects of thermal cross-talk between the laser diodes in the laser thermal printer.

Figure 3:
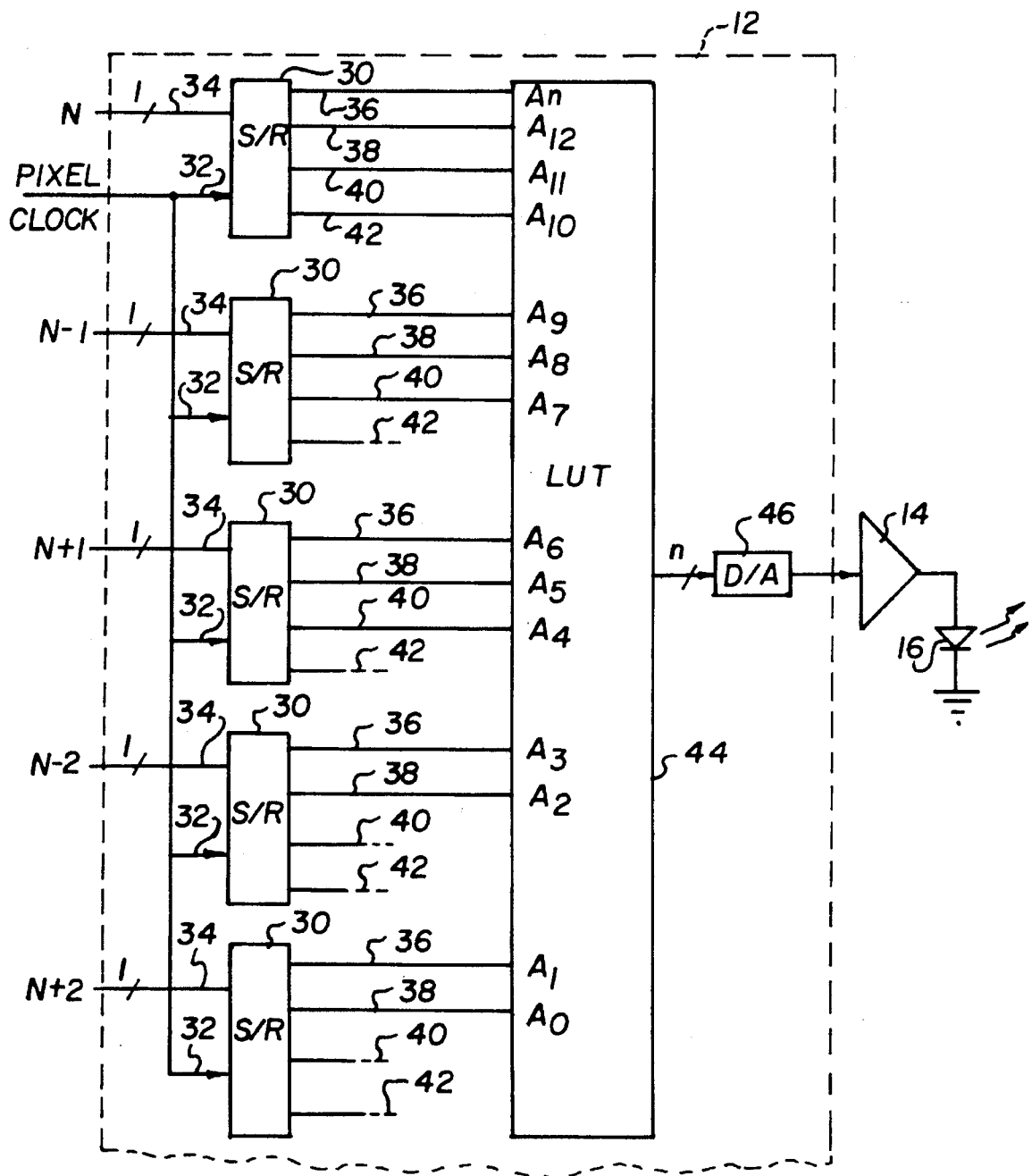
FIG. 3 is a schematic circuit diagram showing an illustrative portion of an alternative embodiment of a control signal generator according to the present invention.

According to an alternative embodiment, the laser thermal printer is operated in a halftone mode to produce a halftone dot that is made up of an array of micropixels as is known in the prior art. Each one of the micropixels in the halftone dot is either ON or OFF, and preferably the micropixels that are ON have identical size and density. Optical output power variations due to the thermal cross-talk between lasers in the laser diode array can result in variability among the micropixels. FIG. 3 shows a block diagram of the control signal generating circuit 12 employed according to the present invention to eliminate the effects of thermal cross-talk between the laser diodes 16. There are two factors which may influence the output of the laser diodes; location or proximity of the influencing elements; and the recent history (the previous several cycles of operation) of their image data. The previous embodiment described above addressed only the first of these influences.

In this embodiment, the effects of previous digital image data will be taken into account. As shown in FIG. 3, the control signal generating circuit 12 includes a plurality of shift registers 30 associated with each laser diode 16 for receiving one bit halftone image data signals from the RIP 10. Each shift register 30 is provided with four outputs. When a pixel clock is applied to the clock input 32 of a shift register, the value currently on the input gate 34 of the shift register is latched on the present output gate 36 of the shift register. On the next clock cycle, the value previously on the output gate 36 is shifted to the output gate 38 and a new value is latched onto output gate 36. In the next clock cycle, the outputs on gates 36 and 38 are shifted to gates 38 and 40 respectively, and the new value is latched onto gate 36. In the next clock cycle, the outputs on gates 36, 38, and 40 are shifted to gates 38, 40 and 42 respectively. This pattern continues at each shift register with appropriate adjustments at the start and end of lines. The values at the outputs of the shift registers are supplied as addresses $A_o$–$A_n$ to a look up table 44. Each laser diode 16 is provided with such a lookup table. The size of the lookup table required will depend upon how many adjacent laser diodes and how many previous cycles need to be accounted for.

In the present example, signals applied to the nearest and next nearest neighboring laser diodes, and a four pixel cycle history is taken into account. The output of the lookup table 44 is a multibit digital representation of the control signal value for driving the laser diode 16 and is preferably 12 bits. The output of the lookup table 44 is applied to a digital to analog converter 46 to produce an analog control signal value, which is supplied to current driver 14 to drive the laser diode 16. A calibration as described above is performed to determine the values stored in the LUT 44.

The digital embodiment described above can be extended to continuous tone printing by providing appropriate additional memory and performing appropriate calibrations.

The invention has been described with reference to a preferred embodiment. However, it will be appreciated that variations and modifications can be effected by a person of ordinary skill in the art without departing from the scope of the invention. For example, although the invention has been described for use in a laser thermal printer, it will also be useful in any other type of printer using a laser array that is subject to thermal cross-talk such as a silver halide printer, or an electrophotographic printer.

PARTS LIST 10 raster image processor
12 control signal generator
14 current driver
16 laser diode
18 laser diode array substrate
20 digital to analog converter
22 nearest neighbor look-up table
24 D/A converter
26 next nearest neighbor look-up table
28 D/A converter
30 shift register
32 clock input
34 input gate
36 output gate
38 output gate
40 output gate
42 output gate
44 look-up table
46 digital to analog converter

We claim:

1. A method of operating a laser diode array in a laser printer, wherein the laser diodes are formed on a common substrate, comprising the steps of;
   a. generating digital image data signals for the individual diodes in the array;
   b. generating correction signals for each diode in the array, the correction signals being generated by weighting selected digital image data signals;
   c. summing the correction signals with the digital image data signals for each diode in the array to produce control signals;
   d. employing the control signals to produce a driving current for each diode in the array; and
   e. applying the driving currents to the diodes in the array.

2. The method of operating a laser diode array claimed in claim 1, wherein the selected digital image data signals are the digital image data signals for the nearest neighboring diodes in the array and the next nearest neighboring diodes in the array.

3. The method of operating a laser diode array claimed in claim 2, wherein the selected digital image data signals include previous digital image data signals.

4. The method of operating a laser diode array claimed in claim 3, wherein the previous digital image data signals are for the diode itself and neighboring diodes.

5. The method of operating a laser diode array claimed in claim 2, wherein the weighting for the digital image data signals for the nearest neighboring diodes is greater than the weighting for digital image data signals for the next nearest neighboring diodes.

6. The method of operating a laser diode array claimed in claim 1, wherein the digital image data signals are 1 bit halftone signals and the control signals are multilevel signals generated from 12 bit digital signals.

7. Apparatus for controlling a laser diode array of the type having the laser diodes formed on a common substrate, in a laser printer, comprising:
   a. a raster image processor for producing digital image data signals;
   b. a control signal generator for receiving the digital image data signals and producing a control signal for each laser diode in the array, the control signal generator including means for adjusting the control signals by adding correction signals to the digital image data signals, the correction signals being generated by weighting selected digital image data signals; and
   c. a current driver responsive to the control signals to produce drive currents for the diodes in the array.

8. The apparatus for controlling a laser diode array claimed in claim 7, wherein the selected digital image data signals are the digital image data signals for the nearest neighboring diodes in the array and the next nearest neighboring diodes in the array.

9. The apparatus for controlling a laser diode array claimed in claim 8, wherein the selected digital image data signals include previous digital image data signals.

10. The apparatus for controlling a laser diode array claimed in claim 9, wherein the previous digital image data signals are for the diode itself and neighboring diodes.

11. The apparatus for controlling a laser diode array claimed in claim 8, wherein the weighting for the control signals for the nearest neighboring diodes is greater than the weighting for control signals for the next nearest neighboring diodes.

12. The apparatus for controlling a laser diode array claimed in claim 7, wherein the digital image data signals are 1 bit halftone signals and the control signals are multilevel signals generated from 12 bit digital signals.

* * * * *